(12) United States Patent
Tran et al.

(10) Patent No.: US 12,505,603 B2
(45) Date of Patent: Dec. 23, 2025

(54) DYNAMIC WEATHER IN VIRTUAL ENVIRONMENTS

(71) Applicant: THE WEATHER COMPANY, LLC, Brookhaven, GA (US)

(72) Inventors: Thai Quoc Tran, San Jose, CA (US); Manan Goyal, Secaucus, NJ (US); Qaish Shabbir Kanchwala, Atlanta, GA (US); Prachi Shirish Khadke, Arlington, MA (US)

(73) Assignee: THE WEATHER COMPANY, LLC, Brookhaven, GA (US)

( * ) Notice: Subject to any disclaimer, the term of this patent is extended or adjusted under 35 U.S.C. 154(b) by 172 days.

(21) Appl. No.: 18/379,524

(22) Filed: Oct. 12, 2023

(65) Prior Publication Data
US 2025/0124639 A1   Apr. 17, 2025

(51) Int. Cl.
*G06T 15/00* (2011.01)
*G06T 11/20* (2006.01)
*G06T 15/80* (2011.01)

(52) U.S. Cl.
CPC .......... *G06T 15/005* (2013.01); *G06T 11/206* (2013.01); *G06T 15/80* (2013.01)

(58) Field of Classification Search
CPC ..... G06T 15/005; G06T 11/206; G06T 15/80; G06T 15/00
See application file for complete search history.

(56) References Cited

U.S. PATENT DOCUMENTS

| | | |
|---|---|---|
| 2017/0345208 A1 | 11/2017 | Ashdown et al. |
| 2019/0304159 A1 | 10/2019 | Dai et al. |
| 2020/0064515 A1 | 2/2020 | Kuhns |
| 2023/0039131 A1 | 2/2023 | Ma et al. |
| 2023/0306672 A1* | 9/2023 | Huang ............ G06T 1/20 |

FOREIGN PATENT DOCUMENTS

| | | |
|---|---|---|
| CN | 109377541 B | 8/2021 |
| CN | 115382215 A | 11/2022 |

OTHER PUBLICATIONS

Anonymously, "Method and System for Providing a 3D Representation of Weather Forecast", IP.com No. IPCOM000257589D, IP.com Electronic Publication Date: Feb. 21, 2019, 3 pages.
International Search Report and Written Opinion in International Application No. PCT/US2024/050547, dated Dec. 4, 2024, 10 pages.

* cited by examiner

*Primary Examiner* — Kent W Chang
(74) *Attorney, Agent, or Firm* — Barnes & Thornburg LLP

(57) ABSTRACT

Mechanisms are provided for rendering virtual objects in a computer generated virtual environment. Physical environment condition data is received and transformed into UV map data structure(s), where each UV map data structure comprises entries that store one or more environment condition values mapped from the physical environment condition data to the UV map data structure. A customized shader processes the UV map data structure(s) to apply environment condition effects to a rendering of a virtual object corresponding to the customized shader. The customized shader executes on the environment condition data of the UV map data structure(s) and specifies a modification to a representation of the virtual object due to the environment condition values represented in the UV map data structure(s). Generation of the virtual object in the virtual environment is controlled based on results of processing the one or more UV map data structures by the customized shader.

21 Claims, 5 Drawing Sheets

DYNAMIC WEATHER IN VIRTUAL ENVIRONMENTS

BACKGROUND

The present application relates generally to an improved data processing apparatus and method and more specifically to an improved computing tool and improved computing tool operations/functionality for providing dynamic weather in virtual environments.

Virtual environments are fast becoming a mainstay of modern society. Virtual environments are utilized for entertainment purposes, e.g., video gaming, such as in massively multiplayer online (MMO) games, for electronic commerce, and for productivity and collaboration, such as by organizations to allow users to perform work in virtualized settings, allow users to communicate and interact with each other even though the users are physically distant from one another, and the like. Virtual environments have been provided to allow users to "live" a virtual life in the virtual environment, e.g., Second Life, The Sims, and the like. Much work is currently directed to advances in providing a Metaverse, i.e., a large scale composition of virtual environments, in which users may even own virtualized property.

In these virtual environments, users are often represented as virtualized versions of themselves, i.e., avatars, which may or may not be consistent with the user's physical appearance. The virtual environments also have virtualized objects representing elements within the virtual environment, with these elements potentially being able to be manipulated by the user via their avatar. In some cases, weather conditions may be virtually represented, but these weather conditions are pre-scripted and are generally coded to affect the virtual environment as a whole, without any correlation to real-time or physical world weather conditions.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for rendering virtual objects in a computer generated virtual environment. The method comprises receiving physical environment condition data from a source computing system, wherein the physical environment condition data is collected by monitoring one or more physical characteristics of a physical environment. The method also comprises transforming the physical environment condition data into one or more UV map data structures. Each UV map data structure is a two-dimensional structured data structure used for rendering three dimensional virtual objects in a virtual environment. Each UV map data structures comprise entries that store one or more environment condition values mapped from the physical environment condition data to the UV map data structure. The method also comprises processing, by a customized shader associated with the computer generated virtual environment, the one or more UV map data structures to apply environment condition effects to a rendering of a virtual object corresponding to the customized shader. The processing comprises applying customized logic of the customized shader that executes on the environment condition data of the one or more UV map data structures and specifies a modification to a representation of the virtual object due to the environment condition values represented in the one or more UV map data structures. In addition, the method comprises controlling generation of the virtual object in the virtual environment based on results of processing the one or more UV map data structures by the customized shader.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
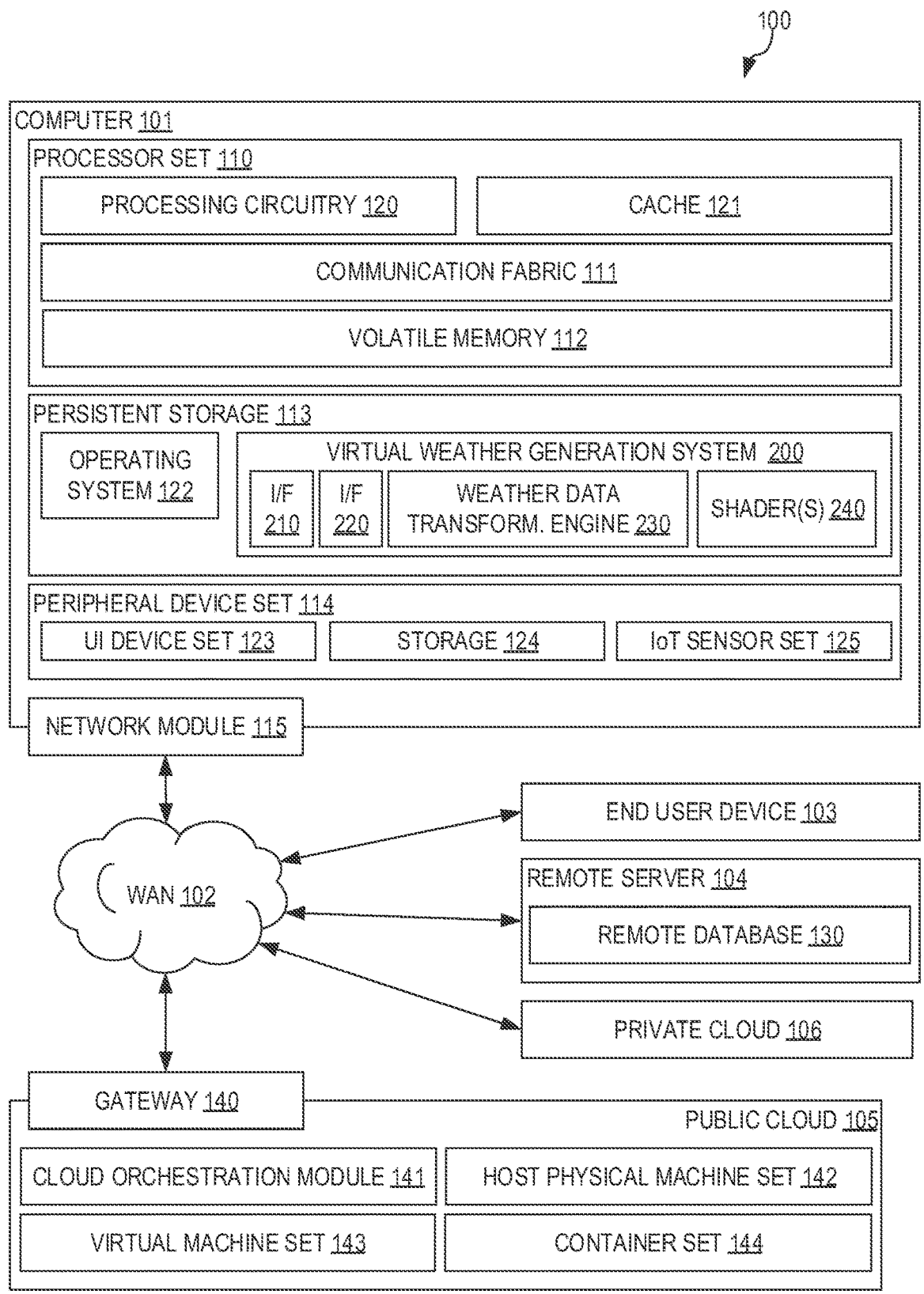
FIG. 1 is an example diagram of a distributed data processing system environment in which aspects of the illustrative embodiments may be implemented and at least some of the computer code involved in performing the inventive methods may be executed.

As noted above, while some virtual environments have weather conditions virtually represented, these weather conditions are pre-scripted and are generally coded to affect the virtual environment as a whole and at a coarse granularity, e.g., representing a storm, representing clear skies, representing cloudy skies, etc., without any correlation to real-time or current/historical physical world weather conditions. Thus, while the virtual environment may have simulated weather effects, the representation of these weather effects is like all other virtual objects in the virtual environment, i.e., are pre-coded. Therefore, the virtual weather effects are not as immersive since the virtual weather representation has no actual relationship with the weather conditions in the corresponding real world physical environment and does not have the level of detail or accuracy of weather conditions that one perceives in the real world physical environment.

The illustrative embodiments provide an improved computing tool and improved computing tool operations/functionality that enables a streaming simulation of realistic and historic weather conditions in a virtual environment. In addition, the illustrative embodiments provide computer mechanisms to enhance virtual environment experiences by using additional parameters which render more accurate weather conditions and compositions. The illustrative embodiments provide mechanisms that simulate weather using current/real-time and/or historical weather data, or in some cases forecasted weather data from other computer simulations of weather conditions based on current/historical weather data. This is achieved, in one or more illustrative embodiments, by transcribing actual real world physical environment weather data, such as may be provided in a Gridded Binary (GRIB) data format or other weather data reporting format, onto one or more UV maps which may then be used by virtual environment processors, such as graphics processing units (GPUs) and the like, to render highly detailed and accurate weather effects in a virtual environment. The weather representation generated by the mechanisms of the illustrative embodiments emulate the real world physical environment weather data in real time, based on historical weather data, or based on forecasted weather data, using an increased number of weather parameters mapped to a large number of channels of UV map data. As a result, the illustrative embodiments deliver a more immersive augmented reality/virtual reality (AR/VR) experience for the end user over existing virtual environment rendering technology.

The following description provides examples of embodiments of the present disclosure, and variations and substitutions may be made in other embodiments. Several examples will now be provided to further clarify various aspects of the present disclosure.

Example 1: A method, in a data processing system, for rendering virtual objects in a computer generated virtual environment. The method comprises receiving physical environment condition data from a source computing system, wherein the physical environment condition data is collected by monitoring one or more physical characteristics of a physical environment. The method further comprises transforming the physical environment condition data into one or more UV map data structures. Each UV map data structure is a two-dimensional structured data structure used for rendering three dimensional virtual objects in a virtual environment. Each UV map data structures comprise entries that store one or more environment condition values mapped from the physical environment condition data to the UV map data structure. The method also comprises processing, by a customized shader associated with the computer generated virtual environment, the one or more UV map data structures to apply environment condition effects to a rendering of a virtual object corresponding to the customized shader. The processing comprises applying customized logic of the customized shader that executes on the environment condition data of the one or more UV map data structures and specifies a modification to a representation of the virtual object due to the environment condition values represented in the one or more UV map data structures. The method further comprises controlling generation of the virtual object in the virtual environment based on results of processing the one or more UV map data structures by the customized shader.

The above limitations advantageously enable the simulation of physical environmental conditions in a virtual environment. The above limitations advantageously leverage UV map data structures to enable customized shaders to be able to apply environmental condition effects to the generation of virtual objects in virtual environments. This makes the rendering of such virtual objects more realistic and more accurate because a finer grain environment condition data is able to be utilized and applied to virtual objects. Moreover, the use of received environmental condition data representing actual physical environment conditions allows for the virtual environment to more accurately reflect the conditions of a physical real-world environment. As a result the rendering of virtual environments, and the virtual objects in the virtual environment, is improved.

Example 2: The limitations of any of Examples 1 and 3-10 where the physical environment condition data is received as a real time stream of physical environment condition data, and where the processing and controlling operations dynamically update the representation of the virtual object in the virtual environment based on the real time stream of physical environment condition data. The above limitations advantageously allow the virtual environment and virtual objects in the virtual environment to be updated dynamically as new physical environment condition data is received in real time. This improves the rendering of virtual environments and the immersion of users into the virtual environments because they will more accurately reflect conditions occurring in the physical environment.

Example 3: The limitations of any of Examples 1-2 and 4-10, where the physical environment condition data is at least one of historical physical environment condition data for a time point prior to a current time, or forecasted physical environment condition data for a time point subsequent to a current time. The above limitations advantageously allow for the recreation of historical physical environment conditions that have occurred in the past. The above limitations may also advantageously allow for the representation of environmental conditions that are predicted or forecasted for a future time point. This allows users to experience these environmental conditions in a virtualized environment as if they were present in those conditions previously or in the future.

Example 4: The limitations of any of Examples 1-3 and 5-10, where the physical environment condition data comprises physical environment weather data having one or more weather characteristics, and wherein the physical environment condition data is received in a Gridded Binary (GRIB) data formatted data structure. The above limitations advantageously allow the illustrative embodiments to utilize a known weather reporting data format to represent weather data and transform the weather data into a format that may be used by customized shaders to apply the weather conditions to the virtual environment and virtual objects within the virtual environment. As a result, weather effects in the virtual environment may be rendered to represent weather that has occurred, is occurring, or may occur in the future, in the physical environment and to represent weather in a more accurate and detailed manner.

Example 5: The limitations of any of Examples 1-4 and 6-10, where the one or more weather characteristics comprise one or more of temperature, humidity, wind speed, wind direction, or precipitation data. The above limitations advantageously allow for various weather characteristics to be represented in the UV map data structures such that their effects on virtual objects and the virtual environment can be accurately represented in the rendering of the virtual environment. Thus, for example, one or more of the effects of temperature, humidity, wind speed, wind direct, or precipitation may be represented and rendered in the virtual environment by the use of the UV map data structures and the customized shader.

Example 6: The limitations of any of Examples 1-5 and 7-10, where controlling generation of the virtual object in the virtual environment based on results of processing the one or more UV map data structures by the customized shader comprises emulating effects of the one or more weather characteristics of the physical environment weather data on the virtual object in the virtual environment. The above limitations advantageously allow for the virtual objects to be rendered in such a way as to simulate similar physical objects that are affected by similar weather conditions in the physical environment. Thus, for example, the effect of wind, precipitation, temperature, humidity, and the like, may be represented on the virtual object in a similar manner as these weather characteristics would effect a similar physical environment object. This improves the realism of the rendering of the virtual object and virtual environment and increases the immersive nature of the virtual environment for the user.

Example 7: The limitations of any of Examples 1-6 and 8-10, where the physical environment condition data comprises a physical location specification and one or more corresponding physical characteristics associated with the physical location. The above limitations advantageously allow for the representation, in the virtual environment, of the environmental conditions of particular physical locations in a physical environment to thereby improve the realism of the virtual environment because it reflects actual physical environments.

Example 8: The limitations of any of Examples 1-7 and 9-10, where transforming the physical environment condition data into one or more UV map data structures comprises: for each physical characteristic associated with each physical location specified in the physical environment condition data, plotting data points, of the physical characteristic, specified in the physical environment condition data and interpolating intermediate data points to generate a map for the physical characteristic; aligning the maps for each of the physical characteristics, associated with the same physical location; and mapping each physical characteristic associated with the same physical location to a separate variable in a corresponding UV map data structure of the one or more UV map data structures. The above limitations advantageously allow for the expansion of the physical environment condition data to include data points between the data points represented in the physical environment condition data itself, as well as allows for the alignment of different physical environment conditions to the same location such that a mapping of the physical environment conditions to a UV map data structure for a given location may be generated. The UV map data structure itself permits the use of custom shaders and graphics processing units (GPUs) to apply effects of environmental conditions on virtual objects when rendering virtual environments.

Example 9: The limitations of any of Examples 1-8 and 10, where the customized shader comprises logic that, for each environment condition value in the one or more environment condition values, modifies the environment condition value based on a predetermined function to generate an effect value corresponding to the environment condition value, and wherein the customized shader comprises logic to apply the effect values to at least one of visual or audible characteristics of the virtual object to modify the rendering of the virtual object. The above limitations advantageously allow the customized shader to apply the effects of various environmental conditions in various ways to the types of virtual objects with which they are associated. That is, different environmental conditions affect different types of objects in different ways and these differences may be represented in the generation of the effect value for the specific type of virtual object associated with the customized shader and the logic of the customized shader as to how the effect value is applied to the virtual object. This improves the rendering of virtual objects such that they may more realistically represent virtual objects in virtual environments in a manner that more accurately represents the effects of various environmental conditions on that type of virtual object.

Example 10: The limitations of any of Examples 1-9, where modifying the environment condition value based on the predetermined function comprises applying a weighting value that indicates a degree to which the corresponding environment condition value affects a type of virtual objects corresponding to the virtual object. The above limitation advantageously allows the customized shader to weight different environmental conditions more or less highly based on how the particular type of virtual object is affected by the corresponding environmental condition. Thus, for example, a virtual object representation of a rock may be less affected by wind than a blade of grass and thus, the weight associated with wind speed and wind direction may be relatively lower for a customized shader associated with a virtual object of a rock than for a customized shader associated with a virtual object of a blade of grass. As a result, the weights represent the level of influence of the environmental condition on the rendering of the virtual object in the virtual environment so as to make the rendering more representative of the physical environment.

Example 11: A system comprising one or more processors and one or more computer-readable storage media collectively storing program instructions which, when executed by the one or more processors, are configured to cause the one or more processors to perform a method according to any one of Examples 1-10. The above limitations advantageously enable a system comprising one or more processors to perform and realize the advantages described with respect to Examples 1-10.

Example 12: A computer program product comprising one or more computer readable storage media, and program instructions collectively stored on the one or more computer readable storage media, the program instructions comprising instructions configured to cause one or more processors to perform a method according to any one of Examples 1-10. The above limitations advantageously enable a computer program product having program instructions configured to cause one or more processors to perform and realize the advantages described with respect to Examples 1-10.

Example 13: A computer-implemented method, system, or computer program product for rendering virtual objects in a computer generated virtual environment. The method, system, or computer program product comprises receiving physical environment condition data from a source computing system, wherein the physical environment condition data is collected by monitoring one or more physical characteristics of a physical environment. The method, system, or computer program product further comprises transforming the physical environment condition data into one or more UV map data structures. Each UV map data structure is a two-dimensional structured data structure used for rendering three dimensional virtual objects in a virtual environment. Each UV map data structures comprise entries that store one or more environment condition values mapped from the physical environment condition data to the UV map data structure. The method, system, or computer program product also comprises processing, by a customized shader associated with the computer generated virtual environment, the one or more UV map data structures to apply environment condition effects to a rendering of a virtual object corresponding to the customized shader. The processing comprises applying customized logic of the customized shader that executes on the environment condition data of the one or more UV map data structures and specifies a modification to a representation of the virtual object due to the environment condition values represented in the one or more UV map data structures. The method, system, or computer program product further comprises controlling generation of the virtual object in the virtual environment based on results of processing the one or more UV map data structures by the customized shader. The method, system or computer program product further includes the physical environment condition data comprising physical environment weather data having one or more weather characteristics, and wherein the physical environment condition data is received in a Gridded Binary (GRIB) data formatted data structure. The method, system or computer program product also includes the controlling emulating effects of the one or more weather characteristics of the physical environment weather data on the virtual object in the virtual environment. The above example advantageously realizes the benefits described with respect to Examples 1, 4, and 6 above.

Example: 14: A computer-implemented method, system, or computer program product for rendering virtual objects in a computer generated virtual environment. The method, system, or computer program product comprises receiving physical environment condition data from a source computing system, wherein the physical environment condition data is collected by monitoring one or more physical characteristics of a physical environment. The method, system, or computer program product further comprises transforming the physical environment condition data into one or more UV map data structures. Each UV map data structure is a two-dimensional structured data structure used for rendering three dimensional virtual objects in a virtual environment. Each UV map data structures comprise entries that store one or more environment condition values mapped from the physical environment condition data to the UV map data structure. The method, system, or computer program product also comprises processing, by a customized shader associated with the computer generated virtual environment, the one or more UV map data structures to apply environment condition effects to a rendering of a virtual object corresponding to the customized shader. The processing comprises applying customized logic of the customized shader that executes on the environment condition data of the one or more UV map data structures and specifies a modification to a representation of the virtual object due to the environment condition values represented in the one or more UV map data structures. The method, system, or computer program product further comprises controlling generation of the virtual object in the virtual environment based on results of processing the one or more UV map data structures by the customized shader. The method, system, or computer program product includes the physical environment condition data comprising a physical location specification and one or more corresponding physical characteristics associated with the physical location. The method, system or computer program product also includes the transforming of the physical environment condition data into one or more UV map data structures comprising: for each physical characteristic associated with each physical location specified in the physical environment condition data, plotting data points, of the physical characteristic, specified in the physical environment condition data and interpolating intermediate data points to generate a map for the physical characteristic; aligning the maps for each of the physical characteristics, associated with the same physical location; and mapping each physical characteristic associated with the same physical location to a separate variable in a corresponding UV map data structure of the one or more UV map data structures. The above example advantageously realizes the benefits described with respect to Examples 1, 7, and 8 above.

Example 15: A computer-implemented method, system, or computer program product for rendering virtual objects in a computer generated virtual environment. The method, system, or computer program product comprises receiving physical environment condition data from a source computing system, wherein the physical environment condition data is collected by monitoring one or more physical characteristics of a physical environment. The method, system, or computer program product further comprises transforming the physical environment condition data into one or more UV map data structures. Each UV map data structure is a two-dimensional structured data structure used for rendering three dimensional virtual objects in a virtual environment. Each UV map data structures comprise entries that store one or more environment condition values mapped from the physical environment condition data to the UV map data structure. The method, system, or computer program product also comprises processing, by a customized shader associated with the computer generated virtual environment, the one or more UV map data structures to apply environment condition effects to a rendering of a virtual object corresponding to the customized shader. The processing comprises applying customized logic of the customized shader that executes on the environment condition data of the one or more UV map data structures and specifies a modification to a representation of the virtual object due to the environment condition values represented in the one or more UV map data structures. The method, system, or computer program product further comprises controlling generation of the virtual object in the virtual environment based on results of processing the one or more UV map data structures by the customized shader. The method, system, or computer program product includes the customized shader comprising logic that, for each environment condition value in the one or more environment condition values, modifies the environment condition value based on a predetermined function to generate an effect value corresponding to the environment condition value, and logic to apply the effect values to at least one of visual or audible characteristics of the virtual object to modify the rendering of the virtual object. The method, system, or computer program product includes the modifying of the environment condition value based on the predetermined function comprising applying a weighting value that indicates a degree to which the corresponding environment condition value affects a type of virtual objects corresponding to the virtual object. The above example advantageously realizes the benefits described with respect to Examples 1, 9, and 10 above.

As noted above, the illustrative embodiments provide an improved computing tool and improved computing tool operations/functionality for providing dynamic weather in virtual environments. As such, the illustrative embodiments are specifically directed to improving computer functionality and computer technology by providing a new functionality not previously able to be obtained by existing virtual environment systems. That is, while virtual environment systems may have virtualized weather effects, e.g., sunny day, raining, cloudiness, these weather effects are completely predefined virtual simulations and not based on any physical (real) world data. Thus, the virtualized weather does not accurately reflect physical (real) world data and is completely based on whatever hard coding of the virtual environment is provided by the software developers. This weather is not tied to any physical (real) world weather conditions and does not have the same level of detailed granularity of weather conditions that may be represented in real world weather data, e.g., while a rainy environment may be depicted, the rainy environment is not based on any barometric pressure, precipitation, temperature, or other real world weather data.

The illustrative embodiments implement specific computer logic and specific computer structures to create dynamic weather in virtual environments and make representation of fine grain granularity weather data in virtual environments a possibility. That is, while virtual environments may represent virtual weather in terms of general weather conditions, e.g., sunny, rainy, foggy, etc., real world weather is much more dynamic and varying with regard to location, elevation/altitude, and the like, and has a large number of variables that may define the weather conditions, which are also inter-related, e.g., variables such as humidity, wind intensity, wind direction, temperature, precipitation, barometric pressure, dew point, and the like, all of which may vary by location, elevation/altitude, and the like. Moreover, atmospheric conditions, such as pollution levels, air quality, and the like, which may also affect environmental conditions are not represented in virtual environments. All of these factors may be collectively referred to herein as weather conditions or weather effects.

In some illustrative embodiments, the dynamic weather in the virtual environment mimics the weather in the physical (real) environment. The dynamic virtualized weather conditions may be generated based on specific weather condition data structures representing physical (real) world or environment weather data, such as may be reported by weather reporting agencies, and mappings to data structures that are able to be used in the rendering of virtual environments, such as UV mapping data structures as discussed hereafter. The illustrative embodiments provide tools that leverage these data structures, by providing mapping logic and specific customized virtual object shaders, to represent the weather of the physical world in virtual environments, and with regard to the rendering of virtual objects in the virtual environment.

In some illustrative embodiments, the mechanisms operate on real-time weather data and may dynamically modify the virtualized weather effects in the virtual environment to represent similar weather conditions to that of the physical (real) world. In other illustrative embodiments, the weather data may be historical weather data which may be used to represent past weather conditions in the virtual environment, or simulate weather conditions in the virtual environment based on machine learning of historical weather conditions to predict current or future weather conditions. For example, in some illustrative embodiments, the simulations may simulate future weather conditions based on historical and/or current weather conditions represented in the weather data, such as in the case of weather forecasting and representation of the weather forecast in a virtual environment. In other illustrative embodiments, the weather data itself may be weather data generated by other weather simulations, e.g., National Weather Service simulations for forecasting weather conditions, and this weather data may be provided as inputs to the mechanisms of the illustrative embodiments.

The mechanisms of the illustrative embodiments are specifically directed to computer generated/augmented virtual environments and specifically to improving the way in which weather is represented in these virtual environments. The term "virtual environment" or "virtual reality" and the like, as used herein, are intended to reference any computer generated environment in which users interact with one or more virtual elements, e.g., virtual objects, of the environment, where these virtual elements are not physically present in the environment, but exist only in the computer even though they may be represented graphically, audibly, etc., for perceiving by a user through the user's senses, e.g., visual, audible, and tactile senses, and in some cases through smell and/or taste. Thus, references to "virtual" environments and "virtual" reality is also intended to encompass augmented reality and augmented environments, as well as any other currently existing or later developed fully or partially virtualized environments.

One aim of the illustrative embodiments is to incorporate real-time and/or historical weather data, or in some cases forecasted weather data, for a physical (real) world environment in the generation of virtualized weather in a virtual reality experience. The illustrative embodiments also enhance the virtual reality experience by using additional parameters which render more accurate weather conditions and compositions. In some illustrative embodiments, improved computing tools and improved computing tool operations/functionality are provided to transcribe and map Gridded Binary (GRIB) based weather data into one or more UV maps which are utilized by computer graphics systems. UV maps, prior to the present invention, were not used to represent any weather information and instead are used for texture and lighting effect mapping in computer graphics. The illustrative embodiments provide improved computing tools and improved computing tool operations/functionality that leverage such UV maps to provide virtual environment computing systems with the ability to dynamically represent weather in virtual environments, where this weather may be representative of real-time and physical world weather conditions. Customized shaders may be used to interpret and process these modified UV mapping data structures, having the mappings of GRIB based weather data, to thereby modify the representations of virtual objects within the virtual environment and more accurately represent weather effects in virtualized environments. The weather effects may reflect real-time weather conditions or may be more accurate simulations of weather effects based on a learning of physical (real) environment weather data and representations of such in the virtual environment by the customized shaders.

It should be appreciated that GRIB is a data structure format that is used in meteorology and environmental sciences to store and exchange weather and climate data. For example, organizations such as the National Oceanic and Atmospheric Administration (NOAA) and the National Weather Service (NWS) with their Digital Forecast Database, use GRIB or GRIB2 data formatting to provide weather and climate data for scientific use. GRIB files typically contain gridded data in binary format, with each data point on a regular grid represented by a single binary value. This makes the file more compact and efficient. In this file, one may find temperate data, pressure data, wind speed and direction data, precipitation data, atmospheric composition data, and the like. These data may be stored at different vertical levels (elevations, altitudes) and time intervals.

UV mapping, in computer graphics, is the three dimensional (3D) modeling process of projecting a 3D computer model's surface to a two dimensional (2D) image for texture mapping. The letters "U" and "V" denote the axes of the 2D texture because "X", "Y", and "Z" are already used to denote the axes of the 3D object in the computer model space. UV maps are used in computer graphics processing to map textures and lighting effects onto a mesh representing the computer model of a virtual object. That is, points on the 2D UV map are mapped to points on surfaces of the 3D computer model of a virtual object to thereby apply the texture of the 2D UV map to the corresponding points on the 3D computer model. This may be seen as essentially "wrapping" the 3D object with the 2D wrapper, similar to wrapping a gift box with wrapping paper.

It should also be appreciated that in 3D computer graphics rendering software, a vertex is represented in 3D space by the values (x, y, z) as noted above. However, in some 3D computer graphics software, additional data may be "painted" onto a vertex (pixel or fragment) via the (r, g, b, a) channels to represent color (red, green, blue) and opacity (alpha "a"). The vertex is a data point that represents a point in 3D space (x, y, z) with the point having a color and opacity represented as (r,g,b,a), but as recognized by the illustrative embodiments, the representation of the vertex need not be limited to just these 7 channels. To the contrary, a vertex may be represented by any suitable number of channels as long as the software is configured to process and interpret those channels of information.

The UV maps add to these 7 channels of information the ability to represent textures and apply those textures to virtual objects. Most computer graphics software can support between 8 and 32 UV channels, where a channel is a 2D map of the (u, v) coordinate. Thus, a point in a UV map at coordinates u, v in the 2D representation may be mapped to a three dimensional point in the 3D model of the object represented by the (x, y, z) and (r, g, b, a) channels. As a result, the texture represented in the UV map at that point may be applied to the corresponding point in the 3D model so as to modify the appearance of the 3D object to have the corresponding texture of the UV map.

The illustrative embodiments recognize that UV maps may be used to represent various types of information that may be applied to 3D models, as long as there is a mechanism to represent the information of interest in the UV map and there are mechanisms that are specifically configured to process and interpret that information in the UV map. In particular, the illustrative embodiments provide mechanisms to translate weather or climate data (weather and climate are referred to herein collectively as "weather" data) from real-world weather data sources into one or more UV maps representing this weather data, e.g., humidity, wind intensity, wind direction, precipitation, barometric pressure, temperature, pollution level, air quality, pollen counts, etc., and provides customized shaders to process and interpret these UV maps to render virtualized weather effects in a virtual environment.

In accordance with the illustrative embodiments, in order to render weather effects in a virtual environment, such as dynamic real-time weather data, historical weather data, or even forecasted weather data, the illustrative embodiments provide computing tools that have improved computing tool functionality to transform and transcribe GRIB data structures onto corresponding UV maps, which are referred to herein as weather UV maps, that can then be processed and interpreted by customized shaders to represent the weather in the virtual environment, e.g., as different types of textures of objects, different lighting effects, different types of virtual objects themselves, or the like. The mechanisms of the illustrative embodiments include interfaces for communicating with weather data source computing systems and obtaining physical (real) environment weather data, such as GRIB data structures storing actual weather data sensed by sensors and obtained from computing systems monitoring one or more physical (real) world locations. The illustrative embodiments further include interfaces for communicating with and interacting with one or more virtual environment computing systems that operate to generate virtual environment(s) for use by one or more users. The virtual environment(s) themselves may take many different forms including entertainment virtual environments, single player, multiple player, and massively multiplayer online (MMO) environments, and the like, virtual electronic commerce environments, virtual work or collaboration environments, or the like.

The illustrative embodiments further comprise a weather data transformation engine which provides computer executed logic to transform the weather data from the weather data source computing systems into one or more weather UV map data structures for weather data of interest. In some cases, the weather data transformation engine may comprise virtual environment profiles specifying which real-world weather data is of interest for representing in the virtual environment, such that different virtual environments may operate on different subsets of the real-world weather data from the weather data source computing systems.

The weather data transformation engine maps the weather data of interest from the weather data source computing systems, such as weather data in one or more GRIB data structures, into corresponding weather UV map data structures. For example, data in the GRIB data structure may represent humidity data for one or more locations. The weather data transformation engine comprises logic that maps the humidity data for a location to u, v, and r values in the weather UV map. For example, the humidity data may have location coordinates of latitude/longitude, which may then be mapped to u and v values, respectively, e.g., u=latitude, v=longitude. The humidity value in the GRIB data structure may then be mapped to the r value of the (r, g, b, a) channels associated with the pixel (or fragment) associated with the u, v values.

To illustrate this further, consider a GRIB data format that consists of an array of data with longitude and latitude values, and a corresponding weather characteristic value, where the weather characteristic value can represent temperature, humidity, or any other real world physical environment measurable weather characteristic, or weather related value computable from measured weather characteristics. A UV map, on the other hand, which is primarily used for texturing, comprises pixel values for an image and has an (r, g, b, a) value. From the GRIB formatted data, values of interest are extracted, e.g., temperature and wind speed/direction. In order to render forecasted, real-time, or historical weather data in a virtual environment, the illustrative embodiments transform and transcribe GRIB formatted data of interest onto the UV maps.

As an example, consider the following pseudocode representation of GRIBs data for temperature in Kelvin (K): pseudo

```
Example:
"data": [
    {
        "latitude": –90,
        "longitude": –180,
        "value": 280.15
    },
    {
        "latitude": –90,
        "longitude": –179,
        "value": 280.18
    },
```

There may be a large number of these GRIB data representations in a collection of current/real-time weather data, historical weather data, or forecasted weather data. Each GRIB data representation in the collection can represent a feature of interest such as humidity, precipitation, etc., and may represent such data under various conditions, such as different levels of elevation, altitude, etc.

These values may be plotted onto a map and the values between plotted points may be estimated using interpolation. The end result are maps of values for each feature of interest. Now, assume one is interested in four weather characteristics or features: wind, temperature, humidity, and precipitation. The illustrative embodiments layer these maps on top of one another so that the coordinates align. From here, each feature is mapped to an r, g, b, a value where r is wind, g is temperature, b is humidity, and a is precipitation. As a result, a weather UV map is generated where there are four features/characteristics of weather data mapped onto one texture representation. This represents a compressed format of weather data that can be easily read by computer implemented shaders, as discussed hereafter.

Custom shaders are provided that are specifically configured to read in this mapped weather data from the weather UV map, and alter the visual representation and displacement of the vertices of virtual environment objects that are affected by these weather conditions. These custom shaders are computer applications or software modules written in a shading language that are executed on the a processing unit, such as a graphics processing unit (GPU). The processing unit operates on vertices and pixels (a.k.a. fragments) to determine color, lighting, reflections, and other visual properties of an object in a scene. The custom shaders also have access to the data on each UV channel of the weather UV map and can interpolate the values between each vertex to determine the fragment data. Thus, if a custom shader is given a UV map that is usually used to represent a texture, but instead has weather data in accordance with the illustrative embodiments, i.e., a weather UV map, the custom shader can use the same process that would be used to represent texture to instead calculate weather conditions at any given point.

As mentioned previously, it should be noted that the illustrative embodiments may operate to enhance or extend the data stream by compositing the weather UV maps. For example, if one is interested in a vertical column of clouds, the weather UV maps may be composited such that each weather UV map represents a layer at a specific elevation or altitude. Moreover, in some cases, one can composite weather UV maps side by side to extend the area of coverage.

As can be seen from the above, various weather UV maps may be generated to represent the weather data that is of interest. For example, the weather UV map may be used to represent a location of a given region where the (r, g, b, a) values of the pixel can represent humidity, wind intensity, wind direction, and precipitation at the particular location specified by the coordinates u, v. A single weather UV map may be used for this purpose where each element in the weather UV map has the four values to represent humidity, wind intensity, wind direct, and precipitation. Alternatively, separate weather UV maps may be generated for each of these different weather conditions of humidity, wind intensity, wind direction, and precipitation.

What kind of data to transcribe is dependent on the desired outcome. For example, if a particular virtual environment is only interested in representing the humidity at ground level, then only one weather UV map is needed, where the r-value represents humidity and where the values themselves are values obtained at ground level. If a virtual environment is to represent vertical humidity data, i.e., humidity at various elevations or altitudes, then a plurality of weather UV maps are needed, one at each vertical level (elevation or altitude) of interest, up to a maximum of the allowed UV channels. If a virtual environment is to represent additional weather (climate) data, such as wind and precipitation, these values can be added to the weather UV map as corresponding (r, g, b, a) values. If there is more data than the allotted (r, g, b, a) values, secondary weather UV maps may be used to hold the overflow of data, e.g., UVmap1(rgba)+UVmap2(rgba)+ . . . +UVmapn(rgba) values, which sum to the total number of values represented in the weather data.

Again, once the weather UV maps are generated, the weather UV maps are input to one or more custom shaders associated with the virtual environment for which the weather data is to be represented in the virtual environment. There may be a different custom shader for each of a plurality of different virtual object types. For example, there may be a custom shader for virtualized rocks, a custom shader for virtualized grass, trees, plants, etc. The custom shaders read the transcribed data from the weather UV maps and alter the visual, audible, and/or other characteristics of 3D virtual object models in the virtual environment based on the data in the weather UV maps. That is, with the illustrative embodiments, the UV channels are used to represent the weather data extracted from the GRIBs data structures. Thus, by processing the UV channels with custom shaders having logic to process and interpret the weather data in the UV channels of the weather UV map data structures, the custom shaders are able to represent the weather conditions and effects with regard to the 3D virtual objects that they are used to render in the virtual environment.

The following is an example of code for a custom shader that operates at a per pixel granularity:

```
fixed4 frag (v2f i) : SV_Target {
    float4 color = tex2D(_MainTex, i.uv);
    float2 windEffect = color.b * _WindSpeed;
    if (windEffect > 3) {
        _swayFactor = 4;
    }
    return color;
}
```

In this example code, the operation starts by obtaining a weather UV map from "MainTex", where the weather UV map contains the extracted and compressed GRIB data as discussed above. The shader reads from the weather UV map by sampling the RGBA values and multiplying these values by custom properties defined by virtual objects. These properties add additional weights to the weather values, as discussed hereafter. It is known in this example that the color b represents wind intensity at a particular longitude and latitude, for example. This value can be multiplied by the wind speed to obtain a modified wind effect value. Once this wind effect value is obtained, the wind effect value can be used in a plethora of different ways to represent the effect of wind on various virtual objects. For example, in this example custom shader, the wind effect value is used to update the swayFactor of the virtual object which informs the GPU how to modify the vertices of the virtual object to represent the virtual object swaying in the wind.

The way in which a particular shader processes and interprets the weather UV map data structures is implementation dependent and may differ from one shader to another. For example, if the weather UV map data structure represents wind intensity and direction, this may be of little concern to a shader associating with rendering virtual rocks in a virtual environment, but may be of greater importance to shaders associated with virtualized grass, trees, and more flexible structures. As such, the shader associated with virtual rocks may not have specialized code or logic that operates based on the wind intensity and direction. However, the shader associated with grass and/or trees may have code for simulating a swaying of the grass/tree according to the wind intensity and direction, such as by moving the location of the vertices where the movement of the vertices may be based on an evaluation of the wind intensity and the wind direction. There are a plethora of different ways that virtual objects can be affected by different weather conditions and events, not all of which can be described herein. However, one of ordinary skill in the art will readily recognize how to code different logic for processing and interpreting weather data from weather UV map data structures to implement weather conditions and effects with regard to virtual objects, in view of the present description.

In general, the way in which the weather data of the weather UV map data structures is processed and interpreted by the custom shaders is dependent upon the type of object and its characteristics, and the type of behaviors that the custom shader developers wish to represent in the virtual environment. For example, consider a scenario where there is a plot of grass, a plant, a tree, and a rock that is to be represented in the virtual environment as virtual objects. Using the weather UV map data structures of the illustrative embodiments, the (r, g, b, a) values of a UV channel, the shaders may have corresponding configuration parameters that may be used to describe how each vertex is affected by the corresponding weather UV channel data. For example, configuration parameters for shaders may be set for the values (r, g, b). For example, for weather UV data structure data representing (wind, humidity, precipitation), corresponding configuration parameters may be set to identify the level of effect each of these weather conditions/effects have on corresponding virtual objects. For example, the configuration parameters of the virtual object shader may be set to values in a range of [0, 255] or [0,1] normalized. A value of 0 means no effect of the particular weather condition/effect on the corresponding virtual object, while a value of 1 means a full effect on the virtual object, with values in between representing varying levels of effect.

With the scenario mentioned previously, the values of the rock virtual object shader may be something like (0, 0, 0) for all vertices because the shader developers may not want the rock virtual objects to be affected by weather conditions at all. The values for the grass virtual object shader may be something like (1, 0, 0) because the shader developers may want wind to sway the grass objects but do not want humidity or precipitation to affect the grass objects. The values for the plant virtual object shader may be something like (0.5, 0, 1) because the shader developers may want wind to sway the plant slightly and may want rain to affect the plant objects. The values for the tree virtual object shader may be categorized into two different types: leaf and trunk. As may be appreciated, the trunk may have similar values to the rock virtual object shader while the leaves may have values similar to the plant virtual object shader. The actual logic for implementing the sway effects, e.g., displacement of vertices, or the change in reflectivity of the object due to precipitation, etc., may be coded into the logic of the shader and implemented based on the level of effect represented by the configuration parameters.

The customer shaders may be provided as part of a virtual weather generation system of the illustrative embodiments that is separate from the virtual environment computing systems which generate the virtual objects in the virtual environment, or may be integrated into the virtual environment computing systems, e.g., the virtual weather generation system may deploy the customer shaders to the virtual environment computing systems or developers may develop the custom shaders directly in the virtual environment computing systems. The custom shaders operate on the 3D virtual object computer models of their corresponding virtual objects to apply the weather conditions/effects represented by the weather data in the weather UV map data structures such that the 3D virtual objects are rendered in the virtual environment by the virtual environment computing systems. Thus, through the operation of the mechanisms of the illustrative embodiments, the rendering of 3D virtual objects in virtual environments is improved by providing a capability to represent weather conditions/effects as specified in detailed weather data from physical (real) world environments, when rendering the 3D virtual objects.

As touched upon above, the weather data in the GRIB data structures, and which is represented in the weather UV map data structures, may be historical weather data, current (as current as possible given the delay of sensing and measuring weather data), or forecasted/simulated weather data. As such, the weather UV map data structures may be used to represent previous weather conditions/effects, current weather conditions/effects, or future/simulated weather conditions/effects in the virtual environment.

In some cases, the weather data in the weather UV map data structures may be used to perform machine learning of one or more computer models to generate weather UV map data structures for virtualized weather conditions/effects in the virtual environment. For example, historical weather data, as converted to one or more weather UV map data structures, may be processed by the one or more computer models to predict current weather conditions/effects. The accuracy of the prediction may be determined by a comparison of the predictions to the current weather conditions/effects to generate a loss or error and then adjust computer model parameters to reduce this loss or error, such as through linear regression or other machine learning algorithms. Thus, through multiple epochs of machine learning using the historical weather data based weather UV map data structures as input, and the current weather data based weather UV map data structures as ground truth, the one or more computer models may be trained to generate weather UV map data structures that predict weather conditions/ effects based on past weather conditions/effects. As a result, the one or more computer models may be used to generate virtualized weather conditions/effects and represent them in corresponding weather UV map data structures, so as to represent the virtualized weather conditions/effects within the virtual environment. These virtualized weather conditions/effects may or may not resemble actual physical (real) world weather conditions/effects.

It should be appreciated that while the primary illustrative embodiments described herein are directed to representing weather and weather effects in virtual environments based on real-world weather data, the illustrative embodiments are not limited to representing weather. To the contrary, any real-world conditions or effects that one desires to represent in a virtual environment may be used as long as there is a data source computing system that can provide the data representing those conditions or effects. The illustrative embodiments may operate to map such data to UV map(s) that are used with customized shaders that are specifically configured to process and interpret the real-world condition/effect data and generate virtual objects and/or modify the representations of the virtual objects in the virtual environment in view of the real-world conditions/effects. As noted above, this may be performed on a real-time basis, based on historical data, and/or based on forecasted or simulated data. For example, various conditions that may affect climate in the physical (real) world may be represented as UV map data structures, such as air quality, pollution, pollen counts for various allergens, and the like. These conditions may be represented in UV map data structures which then may be used by shaders to represent the effects, if any, on virtual objects and the virtual environment as a whole. Moreover, the shaders may have configuration parameters that determine the degree of effect each of these conditions represented in the UV map data structures have on the corresponding virtual objects and/or virtual environment as a whole.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides a virtual weather generation system. The improved computing tool implements mechanism and functionality, such as virtual weather generation in computer generated virtual environments based on physical (real) world weather data, which cannot be practically performed by human beings either outside of, or with the assistance of, a technical environment, such as a mental process or the like. The improved computing tool provides a practical application of the methodology at least in that the improved computing tool is able to improve the representation of weather and weather effects on virtual objects in computer generated virtual environments such that the virtual weather more accurately represents physical (real) world weather.

FIG. 1 is an example diagram of a distributed data processing system environment in which aspects of the illustrative embodiments may be implemented and at least some of the computer code involved in performing the inventive methods may be executed. That is, computing environment 100 contains an example of an environment for the execution of at least some of the computer code involved in performing the inventive methods, such as virtual weather generation system 200 with virtual environment computing system interface 210, weather data source interface(s) 220, weather data transformation engine 230, and virtual element shaders 240. In addition to virtual weather generation system 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and virtual weather generation system 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in virtual weather generation system 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in virtual weather generation system 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As shown in FIG. 1, one or more of the computing devices, e.g., computer 101 or remote server 104, may be specifically configured to implement a virtual weather generation system 200. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computer 101 or remote server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates dynamic virtual weather generation in virtual environments based on physical world weather data.

Figure 2:
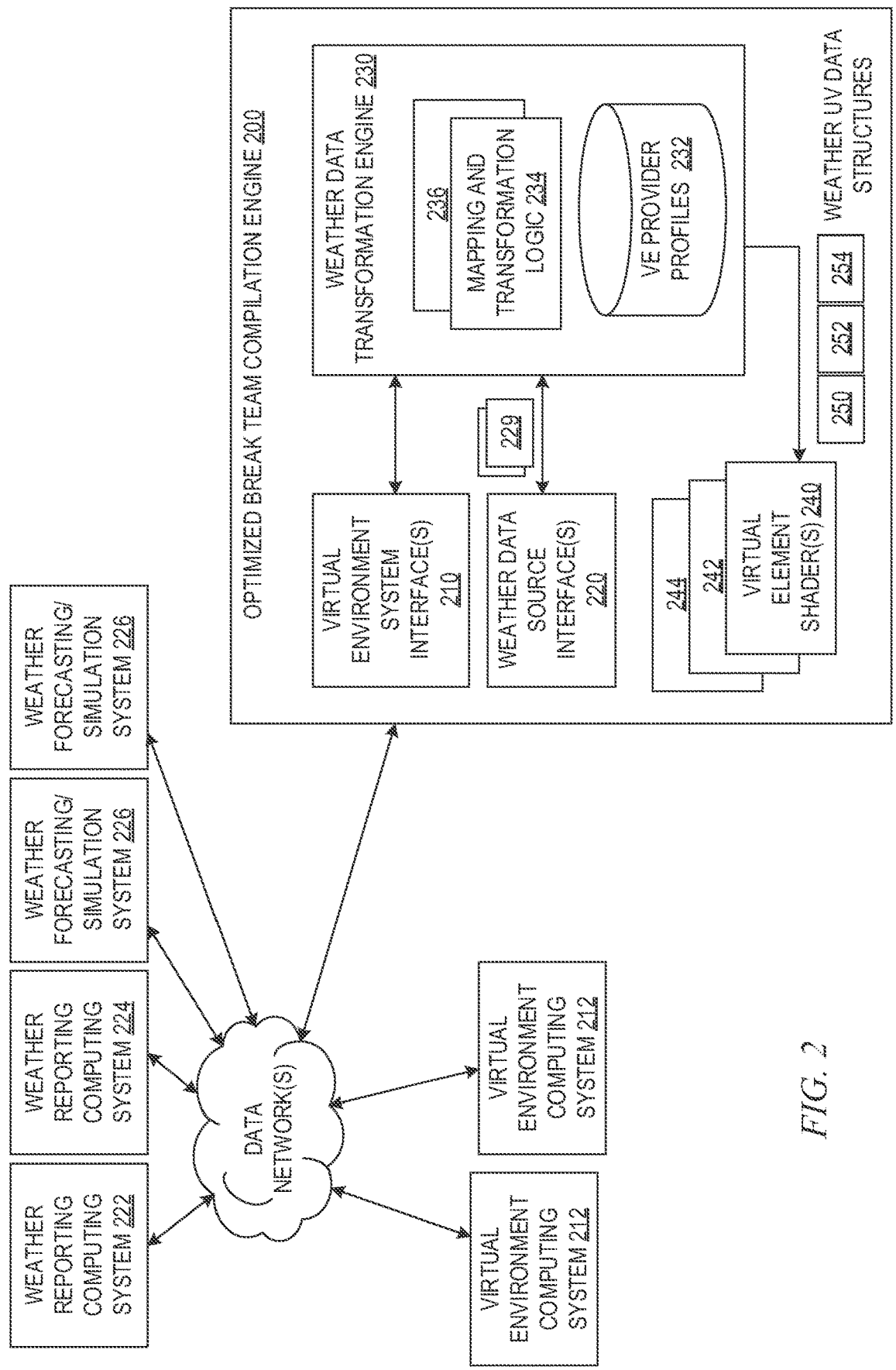
FIG. 2 is a block diagram of a virtual weather generation system in accordance with one illustrative embodiment.

FIG. 2 is a block diagram of a virtual weather generation system in accordance with one illustrative embodiment. The operational components shown in FIG. 2 may be implemented as dedicated computer hardware components, computer software executing on computer hardware which is then configured to perform the specific computer operations attributed to that component, or any combination of dedicated computer hardware and computer software configured computer hardware. It should be appreciated that these operational components perform the attributed operations automatically, without human intervention. The invention is specifically directed to the dynamic and automatic operations of computer components directed to improving the way that weather is represented in virtual environments generated by computing systems and specifically with regard to dynamic weather generation in virtual environments, and their effects on virtual objects in the virtual environment, based on physical (real) world weather data. Such operations cannot be practically performed by human beings as a mental process and is not directed to organizing any human activity.

As shown in FIG. 2, the virtual weather generation system 200 comprises virtual environment computing system interface 210, weather data source interface(s) 220, weather data transformation engine 230, and virtual element shaders 240. The virtual environment computing system interface 210 provides a data communication pathway and logic for communicating with one or more virtual environment computing systems 212-214 to provide information for rendering virtual objects within their corresponding virtual environments. The weather data source interface(s) 220 provide a data communication pathway and logic for communicating with one or more weather data reporting computing systems 222-224 and/or weather forecasting/simulation computing systems 226-228 to obtain weather data upon which the virtual weather generation system 200 operates to generate UV map data structures for representing weather data in the rendering of virtual environments by the virtual environment computing systems 212-214. For example, these weather data reporting computing systems 222-224 and/or weather forecasting/simulation computing systems 226-228 may be computing systems associated with various organizations, government agencies, and the like, that provide weather and/or climate related data, such as the NWS computing systems, NOAA computing systems, or the like.

In accordance with one or more illustrative embodiments, the weather and/or climate related data is received as one or more GRIB formatted data structures or data structures that may be converted to a GRIB format for processing by the illustrative embodiments. It should be appreciated that the GRIB format is used herein as one example of structured weather data that may be used with the mechanisms of the illustrative embodiments to generate weather UV map data structures. However, the illustrative embodiments are not limited to the GRIB format and instead may be used with any structured weather data format desired by the specific implementation. If other formats are utilized, the data mapping/translation logic of the weather data transformation engine 230 may be modified to accommodate the particular structured weather data format, as will be apparent to those of ordinary skill in the art in view of the present description.

As shown in FIG. 2, weather data received from the weather data source computing systems 222-228 via the weather data source interface(s) 220 is provided to the weather data transformation engine 230. The weather data transformation engine 230 comprises mapping and transformation logic engines 234-236 that operate on the weather data to generate one or more weather UV map data structures 250-254, which may comprise one or more primary weather UV map data structures and optionally one or more secondary weather UV map data structures, such as in the case where there are more weather data to represent in the weather UV map data structures than is available in the primary weather UV map channels. That is, the mapping and transformation logic engines 234-236, in accordance with one or more illustrative embodiments, receives the weather data as GRIB data structures 229 and extracts a selected set or subset of the weather data from the GRIB data structures 229 as a basis for generating the one or more UV map data structures 250-254. The particular set or subset of weather data selected may be based on virtual environment computing system profiles 232 which specify which weather data is of interest to the virtual environment computing system providers for representation in the virtual environment, e.g., a first provider may want to represent precipitation and wind intensity and direction, whereas another virtual environment provider may want to represent precipitation, wind intensity and direction, barometric pressure, air quality, and pollution levels.

The mapping and transformation logic engines 234-236 comprise logic that converts the selected weather data from the GRIB data structures 229 into UV map data structures in accordance with the mapping and transformation algorithms. These algorithms operate to map and transform the weather data into a UV map data format where the locations for which the weather data are provided are represented as the coordinates u and v, e.g., latitude and longitude are converted to u and v variables, and the corresponding weather data are converted to corresponding (r, g, b, a) values and/or supplemental UV map variables if needed. Through this conversion, i.e., mapping and transformation, the weather data from the GRIB data structures 229 are mapped and transformed into corresponding variable values, e.g., humidity values may be mapped and transformed to r values in UV maps, wind speed values may be mapped and transformed to g values, wind direction values may be mapped and transformed to b values, and precipitation values may be mapped and transformed to a values. The resulting weather UV map data structures may comprise entries having one or more of the r, g, b, a values, and there may be multiple weather UV map data structures.

In some illustrative embodiments, the weather UV map data structures may be input to one or more machine learning computer models 238 to predict weather UV map data structures for virtualized weather conditions/effects. That is, in some illustrative embodiments, the one or more machine learning computer models 238 may be trained to take weather UV map data structures as input and predict weather UV map data structures for virtualized weather conditions/effects. In this way, simulated weather conditions/effects may be generated based on actual physical (real) world weather data, where the simulated weather conditions/effects may or may not correspond to actual weather conditions/effects in the physical (real) world at the same time. In other illustrative embodiments, the one or more machine learning computer models 238 may receive a set or subset of weather data extracted from the GRIB data structures themselves as input and predict corresponding weather UV map data structures for representing the virtualized weather conditions/effects. It should be appreciated that the machine learning computer models 238 are optional elements of the weather data transformation engine 230 and may not be present in all embodiments or implementations.

The weather UV map data structures 250-254, obtained from the mapping and transformation logic engines 234-236 or the machine learning computer model(s) 238, are input to one or more custom virtual element shaders 240-244, which are algorithms executed to generate 3D virtual objects in virtual environments, and which are specifically customized for processing weather UV map data structures 250-254 to apply weather conditions/effects to corresponding virtual objects. While FIG. 2 shows the one or more custom virtual element shaders 240-244 as being part of the virtual weather generation engine 200, in some illustrative embodiments, the custom virtual element shaders 240-244 may be deployed or integrated into the virtual environment computing systems 212-214 and the weather UV map data structures 250-254 may be provided by the virtual weather generation engine 200 to the virtual environment computing systems 212-214 via the virtual environment computing system interface 210.

The virtual element shaders 240-244 receive as input the weather UV map data structures 250-254. Based on the specific configuration of the virtual element shaders, the weather conditions/effects represented by the data in the weather UV map data structures 250-254 may be more or less applicable to the corresponding virtual elements, e.g., virtual objects, virtual backgrounds, particle effects, etc. handled by the corresponding virtual element shader 240-244, as previously discussed above. Thus, configuration parameters may be set in each of the virtual element shaders 240-244 to specify a level of influence or applicability of weather conditions/effects to the corresponding virtual element, e.g., wind speed and direction have no effect, and thus, are not applied, to virtual rock objects, but may have varying degrees of effect on more flexible objects, such as grass, trees, or even building type structures and thus, may have configuration parameters of varying values within a specified range, e.g., 0 to 255, or 0 to 1, normalized.

In addition to the configuration parameters specifying the level of applicability or effect of the weather conditions/effects on the corresponding virtual elements, the virtual element shaders 240-244 further include logic to specify how the weather conditions/effects actually are represented in rendering the virtual elements. For example, the virtual element shaders 240-244 may comprise logic for modifying characteristics and properties of the virtual objects to represent the weather conditions/effects, e.g., changes in color, reflectivity, texture, position, and the like, based on a mapping of the weather UV map data structure to the vertices of the virtual elements, e.g., 3D virtual objects, associated with the corresponding virtual element shaders 240-244.

The result of the virtual element shaders 240-244 may be provided to the virtual environment computing systems 212-214 via the interface 210, or in some illustrative embodiments in which the virtual element shaders 240-244 are deployed to or integrated in the virtual environment computing systems 212-214, may operate therein to generate the virtual elements with the weather conditions/effects applied to the representation of the virtual elements in the virtual environment. In this way, the weather conditions/effects represented in weather data obtained from physical (real) world weather data reporting, may be applied to virtual elements in virtual environments to thereby improve the way in which virtual elements are represented in these virtual environments.

Figure 3:
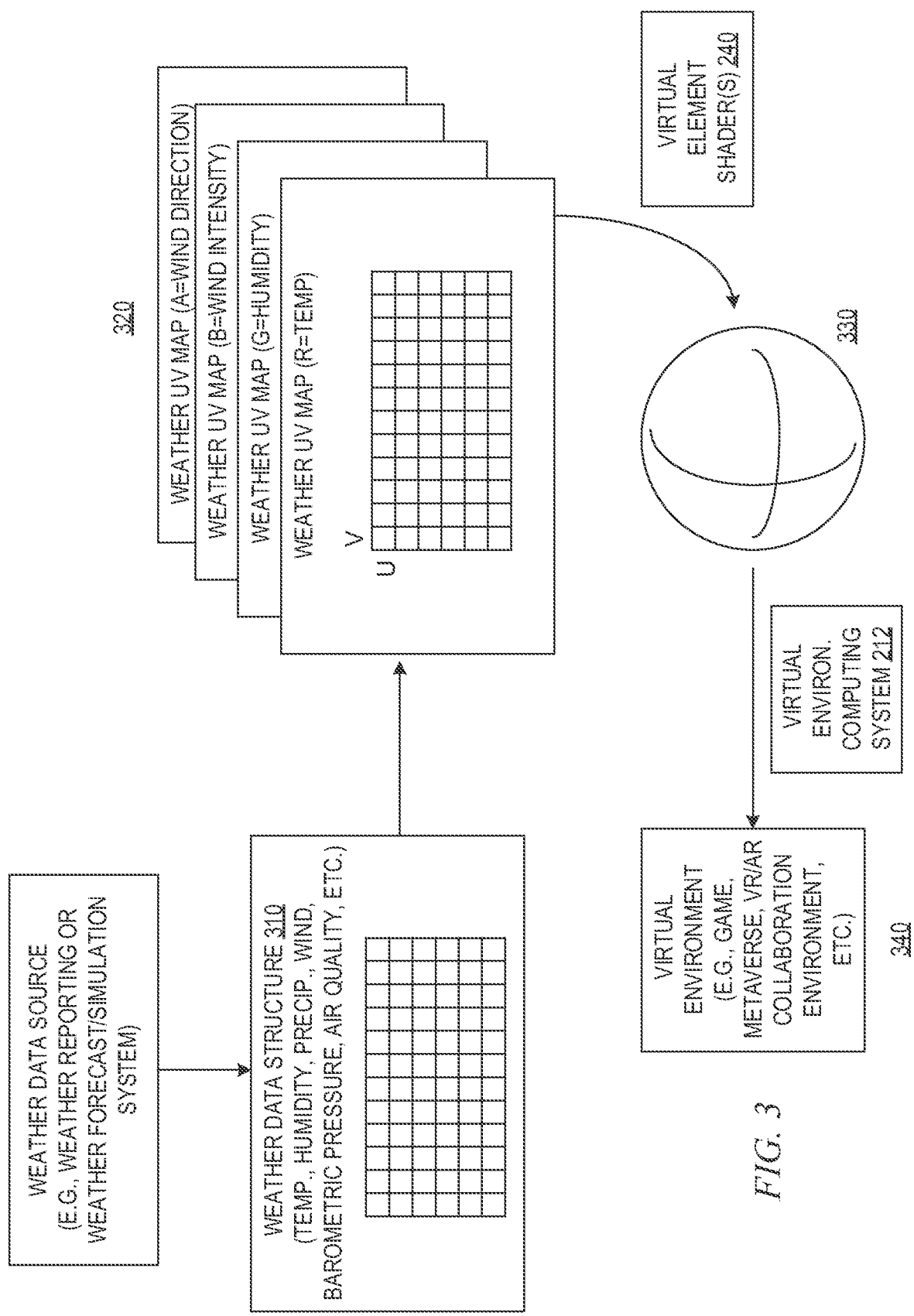
FIG. 3 is an example diagram illustrating the mapping and transformation of weather data from a GRIB data structure to a 3D virtual object in accordance with one illustrative embodiment.

As outlined above, the weather data from weather data sources 222-228 is mapped and transformed into weather UV map data structures which are then used by shaders to represent the weather conditions/effects when rendering virtual elements in the virtual environments. FIG. 3 is an example diagram illustrating the mapping and transformation of weather data from a GRIB data structure to a 3D virtual object in accordance with one illustrative embodiment. As shown in FIG. 3, the operation of mapping and transformation of weather data from a GRIB data structure to a 3D virtual object starts with receipt of the weather data in one or more GRIB data structures 310 from one or more weather data source computing systems. The GRIB data structure(s) 310 are mapped and transformed into one or more weather UV data structures 320. Various weather UV map data structures 320 may be generated to represent the weather data that is of interest which is extracted from the GRIB data structure(s) 310. A single weather UV map data structure may be used for this purpose where each element in the weather UV map has four values (r, g, b, a) to represent weather data of interest, such as humidity, wind intensity, wind direct, and precipitation, for example. Alternatively, separate weather UV map data structures 310 may be generated for each of these different weather conditions of humidity, wind intensity, wind direction, and precipitation. In the depicted example of FIG. 3, the one or more weather UV data structures 320 comprise a separate weather UV data structure 320 for each of the different types of weather data, which are mapped to UV map channels, e.g., r, g, b, and a values for the particular u, v location, where u and v may be latitude, longitude or any other suitable location coordinates.

To perform the mapping and transformation, in some illustrative embodiments, the GRIB data values of interest may be plotted onto one or more maps and the values between plotted points may be estimated using interpolation. The end result are maps of GRIB data values for each feature of interest. The maps are then layered on top of one another so that the coordinates align. Each feature, or weather characteristic of interest, is then mapped to a corresponding r, g, b, a value of the weather UV map data structure 320. As a result, the weather UV map data structure(s) 320 is/are generated where there are features/characteristics of weather data mapped onto a texture representation. There may be multiple ones of these weather UV map data structures 320, depending on the number of weather characteristics/features of interest. The weather UV map data structures 320 provide a compressed format of weather data that can be read by the custom shaders 240-244 to represent the weather effects on aspects of virtual objects and other elements of a virtual environment.

Thus, the weather UV map data structures 320 are applied by the custom shaders 240-244 to their corresponding virtual elements, e.g., 3D virtual objects 330, to thereby apply the weather conditions/effects represented in the weather UV map data structures 320 to the corresponding 3D virtual objects to thereby modify the 3D virtual objects representation in the virtual environment to be consistent with the weather conditions/effects. For example, the virtual environment computing system may invoke or call the custom shaders 240-244 to determine a representation of the 3D virtual object for inclusion in the virtual environment, for each virtual object of that same type that needs to be rendered in the virtual environment.

The custom shaders 240-244 are specifically configured to read in the weather UV map data from the weather UV map data structures and alter the visual representation and displacement of the vertices of virtual environment objects that are affected by these weather conditions and which are associated with the corresponding custom shaders 240-244. For example, see the example custom shader code described above. Many different custom shaders may be developed and coded to perform various different operations for representing the effects of weather data on corresponding virtual objects, with the particular operations being dependent on the desired representation of weather effects in the virtual environment for the particular type of virtual object and type of weather conditions.

The application of the weather UV map data structure(s) 320 by the custom shaders 240-244 to the virtual object data may involve generating weather effect values for the various weather data characteristics based on custom properties defined by the virtual objects. For example, the custom shaders 240-244 may multiplying the weather characteristic data values in the weather UV map data structure 320 by custom properties that add additional weights to the weather data values. The weights indicate the level of effect that the corresponding weather characteristic data values have on the corresponding type of virtual object, e.g., wind does not affect a rock the way in which it would affect a tree or blade of grass. Once the weather characteristic effect value, e.g., a wind effect value, is determined, the weather characteristic effect value may be used by the custom shaders 240-244 and the virtual environment computing system 212 to represent the effect of the weather characteristic on corresponding virtual objects in the virtual environment 340.

Figure 4:
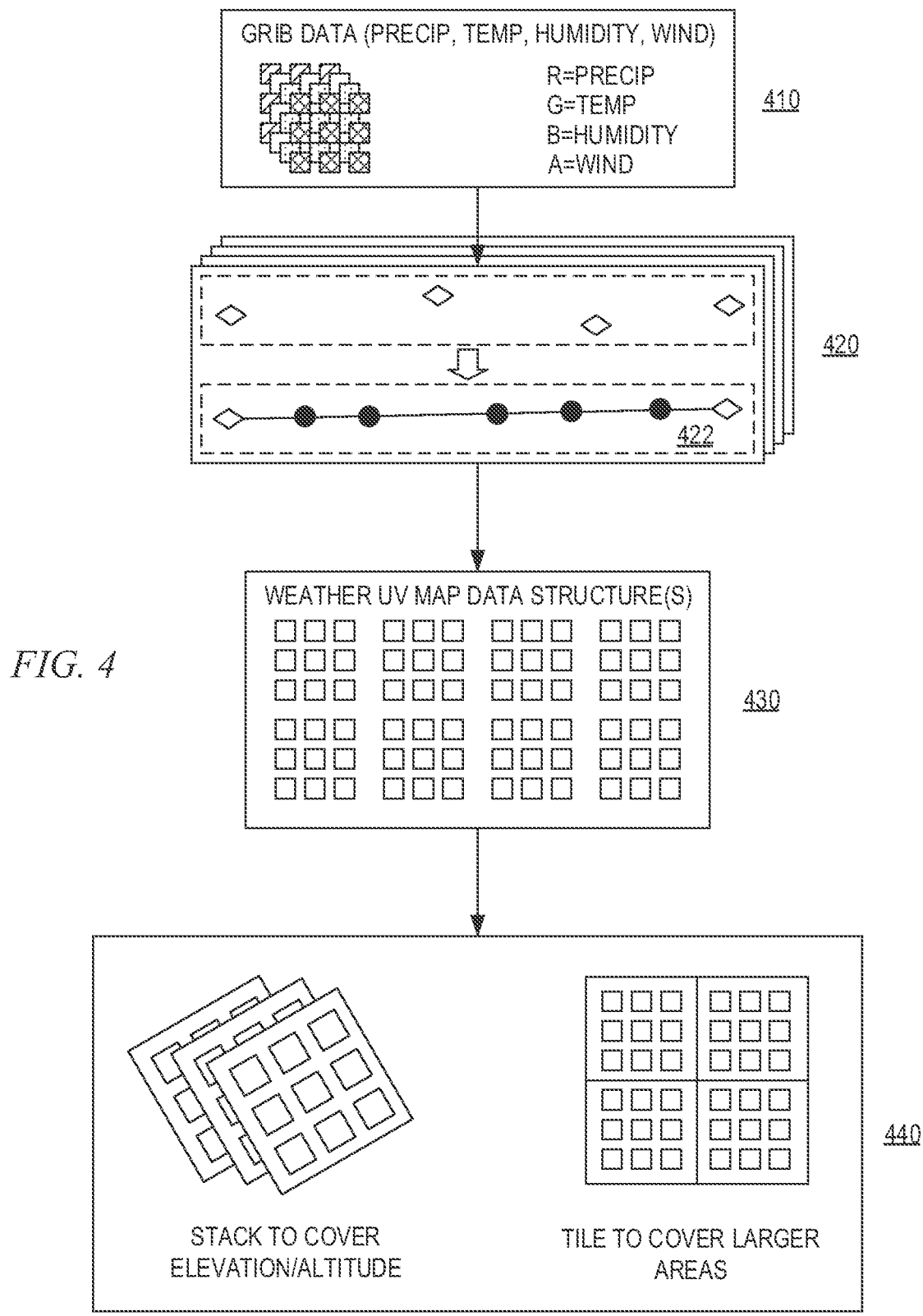
FIG. 4 is an example diagram illustrating a process of transformation of GRIB data to a UV map in accordance with one illustrative embodiment.

FIG. 4 is an example diagram illustrating a process of transformation of GRIB data to a UV map in accordance with one illustrative embodiment. As shown in FIG. 4, GRIB data 410 is received which comprises various weather characteristic data for one or more locations, e.g., the GRIB data 410 may comprise locations specified by latitude and longitude, with corresponding weather characteristic data, e.g., precipitation (precip), temperature (temp), humidity, and wind. The weather characteristic data values may be plotted and the values between plotted points may be estimated using interpolation 420 to generate a map 422.

The end result are maps 422 of values for each weather characteristic/feature of interest.

The illustrative embodiments layer these maps 422 on top of one another so that the coordinates align. From here, each feature is mapped to an r, g, b, a value of a UV map data structure. As a result, a weather UV map 430 is generated where there are features/characteristics of weather data mapped onto a texture representation in the form of the weather UV map 430. This represents a compressed format of weather data that can be easily read by computer implemented shaders, as discussed hereafter.

The weather UV map data structures 430 may be composited 440 in various ways to represent composite weather data for application by custom shaders. For example, the weather UV map data structures 430 may be stacked to cover various levels of height, elevation, or altitude. Moreover, these weather UV map data structures 430 may be tiled so as to expand the area represented by the weather characteristic data of the weather UV map data structures 430. The compositing of the weather UV map data structures 430 is not a required step of the operation, but is an additional step that may be implemented in some illustrative embodiments.

The resulting weather UV map data structures 430, and/or the composites of the weather UV map data structures 430, may be provided to one or more custom shaders associated with various types of virtual objects. The custom shaders provide logic that is specifically configured to process the weather UV map data structures 430 and apply the encoded weather characteristics to represent their effect on the corresponding virtual objects.

Figure 5:
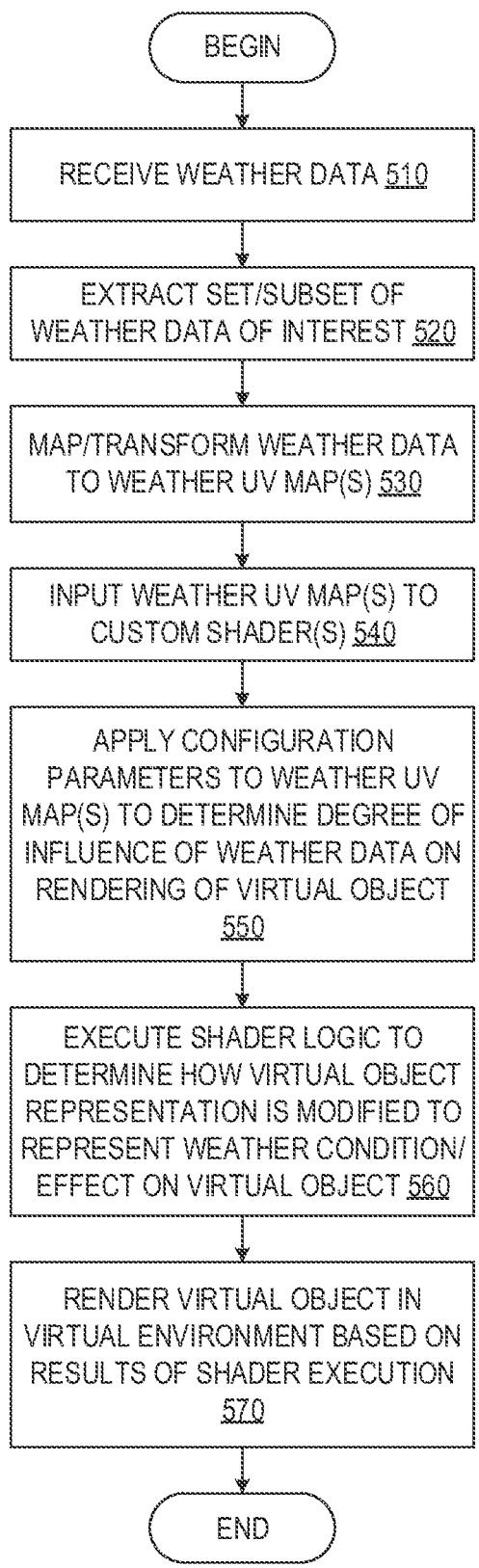
FIG. 5 is a flowchart outlining an example operation of a virtual weather generation system, for rendering weather conditions in a virtual environment based on GRIB weather data structures, in accordance with one illustrative embodiment.

FIG. 5 is a flowchart outlining an example operation of a virtual weather generation system, for rendering weather conditions in a virtual environment based on GRIB weather data structures, in accordance with one illustrative embodiment. It should be appreciated that the operations outlined in FIG. 5 are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIG. 5, and may, in some cases, make use of the results generated as a consequence of the operations set forth in FIG. 5, the operations in FIG. 5 themselves are specifically performed by the improved computing tool in an automated manner.

As shown in FIG. 5 the operation starts by receiving weather data from one or more weather data sources (step 510). As noted above, the weather data may be provided as GRIB data structures or other structured data structures. In some illustrative embodiments, the weather data may be converted to a GRIB data structure and the mapped and transformed to generate one or more weather UV data structures. That is, as shown in FIG. 5, a set or subset of weather data is extracted from the received weather data, such as in accordance with weather data of interest as specified in a virtual environment computing system provider profile (step 520). The set or subset of weather data is mapped and transformed into one or more weather UV map data structures (step 530).

The one or more weather UV map data structures are input to one or more customized virtual element shaders (step 540). The customized virtual element shaders are configured with configuration parameters that specify the degree to which various weather conditions/elements apply to the corresponding virtual elements rendered by the customized virtual element shaders. The configuration parameters of the customized virtual element shaders are applied to the corresponding weather data in the weather UV map data structures to determine a degree of applicability to the corresponding virtual elements (step 550). Based on this degree of applicability, the logic of the customized virtual element shaders is executed to determine how to represent the weather conditions/effects on the virtual element as rendered in the virtual environment (step 560). For example, this may alter the way in which the virtual element appears, sounds, feels, smells, or the like, such as by changing a color, changing a reflectivity, changing a texture, or the like. The particular way in which the weather condition/effect is represented will depend on the specific logic provided in the custom virtualized element shader and the configuration parameter. Thus, a shader may be generated for different types of virtual objects with the logic of the shader being applicable to all virtual objects of the same type. However, specific instances of virtual objects may be differentiated by configuration parameters specified for different instances of the customized virtual element shaders.

The results of the weather UV map data structures by the virtual element shaders are output to the virtual environment computing system software used to generate the virtual environment for use by users (step 570). The operation then terminates.

Thus, the illustrative embodiments provide mechanisms for improving the way in which computer generated virtual environments represent weather in the virtual environment. The illustrative embodiments more accurately represent weather by using physical (real) world weather data as a basis for determining how to generate virtual objects and modify the representations of exiting virtual objects so as to reflect the granularity of physical (real) world weather data and the dynamic or variable nature of this real world weather data. The illustrative embodiments may utilize actual real world weather data that is historical, obtained in real-time, or is based on weather simulations from weather reporting agencies, to determine how to represent weather in the virtual environment. The illustrative embodiments provide computing tools and improved computing tool functionality to specifically map such real-world weather data to data structures previously used for texture mapping such that these data structures can be used to represent real-world weather data and may be processed/interpreted by customized shaders to represent and/or modify the representation of virtual objects in the virtual environment.

As mentioned previously, while the illustrative embodiments have been described in the context of weather and climate data obtained from computing systems that are associated with sensors and monitoring equipment for monitoring physical (real) world environment conditions, the illustrative embodiments are not limited to weather and climate data being used as a basis for generating the UV map data structures for representing environmental conditions/effects in virtual environments, and specifically with regard to virtual objects and elements present in the virtual environment. To the contrary, the illustrative embodiments may operate on any suitable environmental condition data, e.g., light levels, particulate matter levels, sound pollution levels, etc. that one may want to use as a basis for representing virtual elements and objects in a virtual environment. Thus, while weather and climate may be a primary interest in the above illustrative embodiments, other types of environmental condition data may also be used in other illustrative embodiments without departing from the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for rendering virtual objects in a computer generated virtual environment, the method comprising:
receiving weather condition data from a source computing system, wherein the weather condition data is collected by monitoring one or more weather characteristics of a physical environment and comprises a physical location specification and one or more corresponding weather characteristics associated with the physical location;
transforming the weather condition data into one or more UV map data structures, wherein each UV map data structure is a two-dimensional structured data structure used for rendering three dimensional virtual objects in a virtual environment, wherein each UV map data structures comprise entries that store one or more weather condition values mapped from the weather condition data to the UV map data structure, and wherein the transformation of the weather condition data to the UV map data structures maps each value for each weather characteristic to an r, g, b, a value of a UV map data structure such that the weather UV map includes characteristics of weather condition data mapped onto a texture representation in the form of the weather UV map that represents a compressed format of weather data for output to computer implemented shaders;
processing, by a customized computer implemented shader associated with the computer generated virtual environment, the one or more UV map data structures to apply weather condition effects to a rendering of a virtual object corresponding to the customized shader, wherein the processing comprises applying customized logic of the customized shader that executes on the weather condition data of the one or more UV map data structures and specifies a modification to a representation of the virtual object due to the weather condition values represented in the one or more UV map data structures; and
controlling generation of the virtual object in the virtual environment based on results of processing the one or more UV map data structures by the customized shader, wherein transforming the weather condition data into one or more UV map data structures comprises:
for each weather characteristic associated with each physical location specified in the weather condition data, plotting data points, of the weather characteristic, specified in the weather condition data and interpolating intermediate data points to generate a map for the weather characteristic;
aligning the maps for each of the weather characteristics, associated with the same physical location; and
mapping each weather characteristic associated with the same physical location to a separate variable in a corresponding UV map data structure of the one or more UV map data structures.

2. The method of claim 1, wherein the weather condition data is received as a real time stream of weather condition data, and wherein the processing and controlling operations dynamically update representation of the virtual object in the virtual environment based on the real time stream of weather condition data.

3. The method of claim 1, wherein the weather condition data includes at least one of historical weather condition data for a time point prior to a current time, or forecasted weather condition data for a time point subsequent to a current time.

4. The method of claim 1, wherein the weather condition data comprises data having one or more weather characteristics, and wherein the weather condition data is received in a Gridded Binary (GRIB) data formatted data structure.

5. The method of claim 4, wherein the one or more weather characteristics comprise one or more of temperature, humidity, wind speed, wind direction, or precipitation data.

6. The method of claim 4, wherein controlling generation of the virtual object in the virtual environment based on results of processing the one or more UV map data structures by the customized shader comprises emulating effects of the one or more weather characteristics of the weather condition data on the virtual object in the virtual environment.

7. The method of claim 1, wherein the customized shader comprises logic that, for each weather condition value in the one or more weather condition values, modifies the weather condition value based on a predetermined function to generate an effect value corresponding to the weather condition value, and wherein the customized shader comprises logic to apply the effect values to at least one of visual or audible characteristics of the virtual object to modify the rendering of the virtual object.

8. The method of claim 7, wherein modifying the weather condition value based on the predetermined function comprises applying a weighting value that indicates a degree to which the corresponding weather condition value affects a type of virtual objects corresponding to the virtual object.

9. A computer program product comprising a computer readable storage medium having a computer readable program stored therein, wherein the computer readable program, when executed on a computing device, causes the computing device to:
receive weather condition data from a source computing system, wherein the weather condition data is collected by monitoring one or more physical characteristics of a physical environment and comprises a physical location specification and one or more corresponding weather characteristics associated with the physical location;
transform the weather condition data into one or more UV map data structures, wherein each UV map data structure is a two-dimensional structured data structure used for rendering three dimensional virtual objects in a virtual environment, and wherein each UV map data structures comprise entries that store one or more weather condition values mapped from the weather condition data to the UV map data structure, and wherein the transformation of the weather condition data to the UV map data structures maps each value for each weather characteristic to an r, g, b, a value of a UV map data structure such that the weather UV map includes characteristics of weather condition data mapped onto a texture representation in the form of the weather UV map that represents a compressed format of weather data for output to computer implemented shaders;

process, by a customized computer implemented shader associated with the computer generated virtual environment, the one or more UV map data structures to apply weather condition effects to a rendering of a virtual object corresponding to the customized shader, wherein the processing comprises applying customized logic of the customized shader that executes on the weather condition data of the one or more UV map data structures and specifies a modification to a representation of the virtual object due to the weather condition values represented in the one or more UV map data structures; and control generation of the virtual object in the virtual environment based on results of processing the one or more UV map data structures by the customized shader, wherein transforming the weather condition data into one or more UV map data structures comprises:

for each weather characteristic associated with each physical location specified in the weather condition data, plotting data points, of the weather characteristic, specified in the weather condition data and interpolating intermediate data points to generate a map for the weather characteristic;

aligning the maps for each of the weather characteristics, associated with the same physical location; and mapping each weather characteristic associated with the same physical location to a separate variable in a corresponding UV map data structure of the one or more UV map data structures.

10. The computer program product of claim 9, wherein the weather condition data is received as a real time stream of weather condition data, and wherein the processing and controlling operations dynamically update the representation of the virtual object in the virtual environment based on the real time stream of weather condition data.

11. The computer program product of claim 9, wherein the weather condition data is at least one of historical weather condition data for a time point prior to a current time, or forecasted weather condition data for a time point subsequent to a current time.

12. The computer program product of claim 9, wherein the weather condition data comprises weather data having one or more weather characteristics, and wherein the weather condition data is received in a Gridded Binary (GRIB) data formatted data structure.

13. The computer program product of claim 12, wherein the one or more weather characteristics comprise one or more of temperature, humidity, wind speed, wind direction, or precipitation data.

14. The computer program product of claim 12, wherein controlling generation of the virtual object in the virtual environment based on results of processing the one or more UV map data structures by the customized shader comprises emulating effects of the one or more weather characteristics of the weather data on the virtual object in the virtual environment.

15. The computer program product of claim 9, wherein the customized shader comprises logic that, for each environment condition value in the one or more weather condition values, modifies the weather condition value based on a predetermined function to generate an effect value corresponding to the weather condition value, and wherein the customized shader comprises logic to apply the effect values to at least one of visual or audible characteristics of the virtual object to modify the rendering of the virtual object.

16. An apparatus comprising:

at least one processor; and at least one memory coupled to the at least one processor, wherein the at least one memory comprises instructions which, when executed by the at least one processor, cause the at least one processor to:

receive weather condition data from a source computing system, wherein the weather condition data is collected by monitoring one or more weather characteristics of a physical environment and comprises a physical location specification and one or more corresponding weather characteristics associated with the physical location;

transform the weather condition data into one or more UV map data structures, wherein each UV map data structure is a two-dimensional structured data structure used for rendering three dimensional virtual objects in a virtual environment, and wherein each UV map data structures comprise entries that store one or more weather condition values mapped from the weather condition data to the UV map data structure, and wherein the transformation of the weather condition data to the UV map data structures maps each value for each weather characteristic to an r, g, b, a value of a UV map data structure such that the weather UV map includes characteristics of weather condition data mapped onto a texture representation in the form of the weather UV map that represents a compressed format of weather data for output to computer implemented shaders;

process, by a customized computer implemented shader associated with the computer generated virtual environment, the one or more UV map data structures to apply weather condition effects to a rendering of a virtual object corresponding to the customized shader, wherein the processing comprises applying customized logic of the customized shader that executes on the weather condition data of the one or more UV map data structures and specifies a modification to a representation of the virtual object due to the weather condition values represented in the one or more UV map data structures; and control generation of the virtual object in the virtual environment based on results of processing the one or more UV map data structures by the customized shader, wherein transforming the weather condition data into one or more UV map data structures comprises:

for each weather characteristic associated with each physical location specified in the weather condition data, plotting data points, of the weather characteristic, specified in the weather condition data and interpolating intermediate data points to generate a map for the weather characteristic;

aligning the maps for each of the weather characteristics, associated with the same physical location; and mapping each weather characteristic associated with the same physical location to a separate variable in a corresponding UV map data structure of the one or more UV map data structures.

17. The apparatus of claim 16, wherein the weather condition data is received as a real time stream of weather condition data, and wherein the processing and controlling operations dynamically update representation of the virtual object in the virtual environment based on the real time stream of weather condition data.

18. The apparatus of claim 16, wherein the weather condition data includes at least one of historical weather condition data for a time point prior to a current time, or forecasted weather condition data for a time point subsequent to a current time.

19. The apparatus of claim 16, wherein the weather condition data comprises data having one or more weather characteristics, and wherein the weather condition data is received in a Gridded Binary (GRIB) data formatted data structure.

20. The apparatus of claim 19, wherein the one or more weather characteristics comprise one or more of temperature, humidity, wind speed, wind direction, or precipitation data.

21. The apparatus of claim 19, wherein controlling generation of the virtual object in the virtual environment based on results of processing the one or more UV map data structures by the customized shader comprises emulating effects of the one or more weather characteristics of the weather condition data on the virtual object in the virtual environment.

* * * * *